Patented Feb. 1, 1949

2,460,618

UNITED STATES PATENT OFFICE 2,460,618

TRIAZINE AZO DYES

Eduard Bernasconi, Basel, Switzerland, assignor to Ciba Limited, Basel, Switzerland, a Swiss firm No Drawing. Application June 30, 1945, Serial No. 602,677. In Switzerland August 9, 1944

3 Claims. (Cl. 260—153)

It has already been proposed to manufacture dyestuffs which contain two different lake-forming components, namely, on the one hand, the atomic grouping formed by coupling a diazotized ortho-aminophenol with 2-amino-5-hydroxynaphthalene-7-sulfonic acid in an alkaline medium, and, on the other hand, the radical of a dyestuff of the type of 4-amino-4'-hydroxy-1:1'-azobenzene-3'-carboxylic acid. Thus, U. S. Patent No. 1,667,312 describes in Example 15 the ternary condensation product from 1 mol of cyanuric chloride, 1 mol of the azo-dyestuff from diazotized 1-amino-2-hydroxybenzene-5-sulfonic acid and 2-amino-5-hydroxynaphthalene-7-sulfonic acid (coupled in an alkaline medium), 1 mol of 4-amino-4'-hydroxy-1':1'-azobenzene-3'-carboxylic acid and 1 mol of aniline. Further, U. S. Patent No. 1,783,084 describes the manufacture of the mixed urea from 1 mol of the azo-dyestuff from diazotized 1-amino-2-hydroxybenzene-3-carboxylic acid-5-sulfonic acid and 2-amino-5-hydroxynaphthalene-7-sulfonic acid (coupled in an alkaline medium) and 1 mol of 4-amino - 4'- hydroxy -1':1'- azobenzene - 3'-carboxylic acid.

These dyestuffs are distinguished in that they yield copper compounds which are valuable direct dyestuffs. If, on the other hand, the copper compounds of these dyestuffs are formed on the fiber by after-coppering textiles dyed with the metal-free dyestuffs, the wet-fastness properties, although improved, do not meet present-day requirements.

The present invention is based on the observation that, in contradistinction to the above known dyestuffs, the new products which correspond in the free form to the general formula

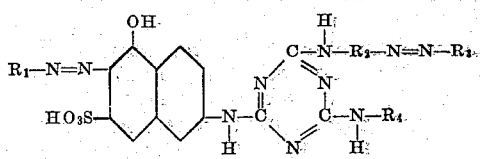

in which $R_1$, $R_2$ and $R_3$ represent unsulfonated benzene nuclei of which $R_1$ carries a hydroxyl group in ortho-position to the azo-linkage, $R_2$ contains the NH-group and the azo-linkage, $R_3$ contains the NH-group and the azo-linkage in 1:4-position relatively to one another, and $R_3$ contains a hydroxyl group in 4-position with respect to the azo-linkage and a carboxyl group in ortho-position with respect to the said hydroxyl group, and $R_4$ represents also an unsulfonated benzene nucleus or stands for a radical —$R_5$—N=N—$R_6$ in which $R_5$ and $R_6$ represent unsulfonated benzene nuclei, $R_5$ containing the NH-group and the azo-linkage in 1:4-position relatively to one another, and $R_6$ containing a hydroxyl group in 4-position with respect to the azo-linkage and a carboxyl group in ortho-position with respect to the said hydroxyl group, are dyestuffs whose copper compounds, when produced on the fiber, yield dyeings having excellent fastness to light and wet fastness properties.

Among these dyestuffs those are particularly valuable wherein $R_4$ represents an unsulfonated benzene radical.

But also the dyestuffs corresponding to the free form to the general formula

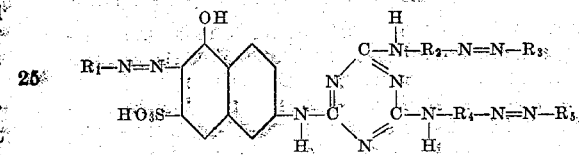

wherein $R_1$, $R_2$, $R_3$, $R_4$ and $R_5$ are unsulfonated benzene nuclei in which $R_1$ contains a hydroxyl group in ortho-position with respect to the azo-group, $R_2$ and $R_4$ contain the NH-group and the azo-linkage in 1:4-position relatively to one another, and $R_3$ and $R_5$ contain a hydroxyl group in 4-position with respect to the azo-linkage and a carboxyl group in ortho-position with respect to this hydroxyl group, constitute valuable products.

The manufacture of the new dyestuffs can be deduced from their composition.

For example, they can be obtained by causing 1 mol of a diazotized ortho-aminophenol free from sulfonic acid groups, 1 mol of 2-amino-5-hydroxynaphthalene-7-sulfonic acid, 1 mol of cyanuric chloride or 1 mol of cyanuric bromide and 1-2 mols of 4-amino-4'-hydroxy-1:1'-azobenzene - 3' - carboxylic acids free from sulfonic acid groups to react with one another in such a manner that the diazo compound couples in the 6-position of the amino-hydroxynaphthalene-sulfonic acid, that one halogen atom of the cyanuric halide reacts with the amino group of the amino-hydroxynaphthalene sulfonic acid, and that 1 to 2 halogen atoms of the cyanuric halide react with the amino group of the amino-hydroxyazobenzene carboxylic acid, and causing the halogen atom which may not have been converted to react with a primary aromatic amine of the benzene series which is free from sulfonic acid groups.

The products can also be obtained by using for the condensation, instead of one or both of the amino-hydroxyazobenzene carboxylic acids, an amine or amines of the benzene series which contain in 4-position to the amino-group a second amino-group or a group convertible into an amino group, condensing the product, and then, after the reaction and, if required, after converting into an amino group the group so convertible, diazotizing or tetrazotizing the condensation product and coupling the resulting diazo compound with 1 mol of a hydroxy-compound of the benzene series carrying a carboxyl group in ortho-position to the OH-group and capable of coupling with diazo-compounds in 4-position with respect to the hydroxyl group, or coupling the resulting tetrazo-compound with 2 mols of such hydroxy-compounds which may be the same or different. It is self-evident that the order of succession in which the above operations are performed should be so chosen that the reactions will take the desired course. By observing this precaution reaction of the diazotized condensation products with the aminonaphthol sulfonic acid residue is avoided.

For the introduction of the radical $R_1$ into the new azo-dyestuffs, there may be used, for example, the diazo compounds of the following amines:

1-amino-2-hydroxybenzene, 1-amino-2-hydroxy-5-chlorobenzene, 1-amino-2-hydroxy-5-nitrobenzene, 1-amino-2-hydroxybenzene-5-sulfamide, and the like.

For introducing the radical

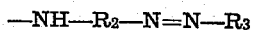

$-NH-R_2-N=N-R_3$ the following aminoazo-dyestuffs may be used:

4-amino-4'-hydroxy-1:1'-azobenzene-3'-carboxylic acid, 4-amino-4'-hydroxy-5'-methyl-1:1'-azobenzene-3'-carboxylic acid, 4-amino-4'-hydroxy-2'-methyl-1:1'-azobenzene-3'-carboxylic acid, 4-amino-2-methyl-4'-hydroxy-1:1'-azobenzene-3'-carboxylic acid, 4-amino-2-methoxy-4'-hydroxy-1:1'-azobenzene-3'-carboxylic acid, 4-amino-2-chloro-4'-hydroxy-1:1'-azobenzene-3'-carboxylic acid, 4-amino-3-methyl-5-methoxy-4'-hydroxy-1:1'-azobenzene-3'-carboxylic acid, 4-amino-2-methyl-5-methoxy-2'-methyl-4'-hydroxy-1:1'-azobenzene-3'-carboxylic acid, and the like.

For the purpose of introducing the radical $-NH-R_4$ there can be used, besides the already indicated aminoazo-dyestuffs, simple amines, such as aniline, 1-aminobenzene-3-carboxylic acid, 4-aminoacetanilide, etc.

The introduction of one or both of the azo-dyestuff radicals can also be effected by causing 1 to 2 hologen atoms of the cyanuric halide to react with compounds such as 1-amino-4-nitrobenzene, 1-amino-4-acetylaminobenzene, 1-amino-2-methyl- or 2-methoxy-4-nitrobenzene, 1-amino-2-methoxy-5-methyl-4-nitrobenzene, etc. The nitro- or acylamino-group is than converted in known manner into a primary amino group which is diazotized and the diazo compound is coupled with hydroxy-carboxylic acids of the benzene series, such as 1-hydroxybenzene-2-carboxylic acid or 1-hydroxy-5- or -6-methylbenzene-2-carboxylic acid.

The new dyestuffs are distinguished by their affinity for cellulose fibers, either of regenerated or natural cellulose. They can, therefore, be used for dyeing cotton, ramie, jute, viscose or cuprammonium artificial silk, staple fibers of regenerated cellulose which may, if desired, be matted with titanium oxide and which may be produced either by the viscose or cuprammonium process. The dyestuffs can also be used for dyeing mixtures of these materials with, for example, animal fibers such as wool or silk. The new dyestuffs dye these materials more or less reddish orange-brown shades which become darker by after-treatment on the fiber with agents yielding copper, for example, copper sulfate or an alkaline copper tartrate solution, and then possess excellent wet fastness properties, combined with a very good fastness to light.

Dyestuffs having similar properties are also the dyestuffs of the general formula

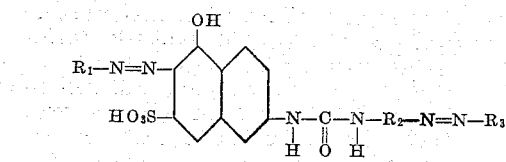

wherein $R_1$, $R_2$ and $R_3$ have the above indicated significance. The manufacture of these dyestuffs can also be deduced from their composition.

Such dyestuffs can be obtained, for example, by causing 1 mol of a diazotized ortho-aminophenol free from sulfonic acid groups, 1 mol of the 2 - amino - 5 - hydroxynaphthalene - 7 - sulfonic acid, 1 mol of phosgene and 1 mol of a 4 - amino - 4' - hydroxy - 1:1' - azobenzene - 3'-carboxylic acid free from sulfonic acid groups to react with one another in such a manner that the diazo compound enters into the 6-position of the aminohydroxynaphthalene-sulfonic acid, and that the phosgene reacts with the amino groups of the amino-hydroxy-naphthalene-sulfonic acid and the aminoazobenzene carboxylic acid in such a manner that a urea derivative is formed. It is also possible, for example, to produce in known manner a mixed urea from 2-amino-5-hydroxynaphthalene-7-sulfonic acid and 1:4-diaminobenzene, and then further working up this mixed urea to the disazo-dyestuff.

The following examples illustrate the invention, but are not to be regarded as limiting it in any way, the parts being by weight:

*Example 1*

18.8 parts of 1-amino-2-hydroxybenzene-5-sulfamide are dissolved in 150 parts of water of 50° C. and 25 parts of hydrochloric acid of 30 per cent. strength. The solution is cooled to 0° C. and diazotized with 6.9 parts of sodium nitrite in 25 parts of water. In the meantime 66.4 parts of the ternary condensation product prepared in known manner from one mol each of cyanuric chloride, 2-amino-5-hydroxynaphthalene-7-sulfonic acid, 4-amino-4'-hydroxy-1:1'-azobenzene-3'-carboxylic acid and aniline are dissolved at 50° C. in 1600 parts of water and 30 parts of sodium carbonate. The solution is cooled to 10° C. with ice and mixed with the diazonium solution. The mixture is stirred until the diazonium compound cannot be detected any longer. It is then heated to 80° C. and the dyestuff which has formed is salted out. This corresponds in the free form to the formula

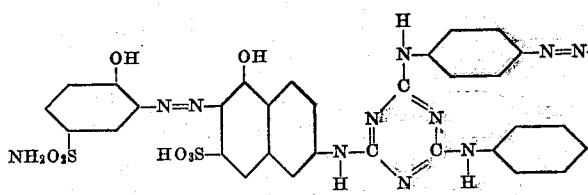

After filtering and drying there is obtained a dark brown powder which dyes cotton from a bath, to which copper sulfate and sodium tartrate have been added, red brown shades possessing good fastness to light and to washing.

If in this example 1-amino-2-hydroxybenzene-5-sulfamide is replaced by 1-amino-2-hydroxy-5-nitrobenzene or 1-amino-2-hydroxy-5-chlorobenzene there are obtained redder dyestuffs having the same fastness properties.

Similar dyestuffs are also obtained by replacing the 4-amino-4'-hydroxy-1:1'-azobenzene-3'-carboxylic acid by another, similarly constituted aminoazobenzene carboxylic acid, for example, the 4-amino-2-methyl-4'-hydroxy-1:1'-azobenzene-3'-carboxylic acid, the 4-amino-2-methyl-5-methoxy-4'-hydroxy-1:1'-azobenzene-3'-carboxylic acid, the 4-amino-3'-methyl-4'-hydroxy-1:1'-azobenzene-3'-carboxylic acid, or the 4-amino-2:5'-dimethyl-5-methoxy-4'-hydroxy-1:1'-azobenzene-3'-carboxylic acid, and the aniline by the para-toluidine or the 4-amino-salicylic acid. Such dyestuffs correspond, for example, to the formulas

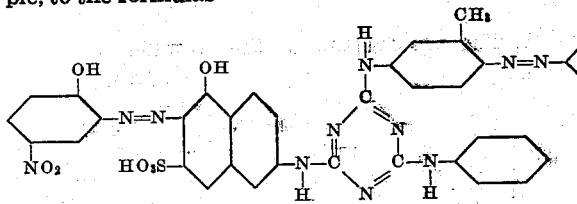

or

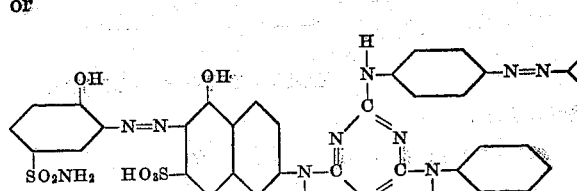

Example 2

18.8 parts of 1-amino-2-hydroxybenzene-5-sulfamide are diazotized as described in Example 1. The diazonium solution is poured to a solution of 82.8 parts of the ternary condensation product prepared in known manner from 1 mol of cyanuric chloride, 1 mol of 2-amino-5-hydroxynaphthalene-7-sulfonic acid and 2 mols of 4-amino-4'-hydroxy-1:1'-azobenzene-3'-carboxylic acid and 30 parts of sodium carbonate in 1600 parts of water. When coupling is complete the dyestuff is worked up in known manner. The resulting dyestuff which corresponds in the free form to the formula

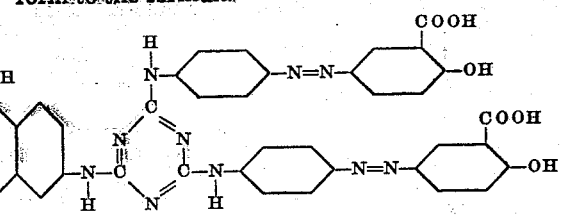

dyes cotton from a bath containing copper salts brown shades of good fastness to light and to washing.

When replacing the 1-amino-2-hydroxybenzene-5-sulfamide by 1-amino-2-hydroxy-5-nitrobenzene or 1-amino-2-hydroxy-5-chlorobenzene, there are obtained similar dyestuffs having the same fastness properties.

Furthermore, 1 mol or 2 mols of the 4-amino-4'-hydroxy-1:1'-azobenzene-3'-carboxylic acid can be replaced by 1 mol or 2 mols of the aminoazo-dyestuffs recommended in the introduction for introducing the radical $$-N-R_2-N=N-R_3$$
$$\phantom{-N-}H$$

Such dyestuffs correspond in the free form to the formulas

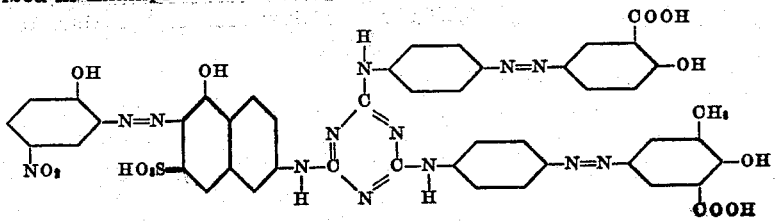

or

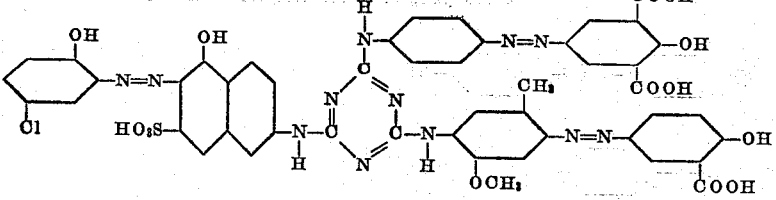

Example 3

100 parts of cotton are entered at 40–50° C. into a dyebath containing 3000 parts of water, 1.5 parts of the dyestuff obtained as described in the first paragraph of Example 1 and 2 parts of anhydrous sodium carbonate. The bath temperature is raised to 90–95° C. in the course of ½ hour, 30 parts of crystalline sodium sulfate are then added, and dyeing is conducted at the same temperature for ¾ hour. There is then added to the dyebath a solution of 2 parts of crystalline copper sulfate and 2.5 parts of tartaric acid in 100 parts of water, which solution is neutralized with caustic soda solution, and the cotton is treated for ½ hour at about 95° C. the cotton is then rinsed and dried in the usual manner. It is dyed fast red-brown tints.

As stated in the opening part of the specification, the dyestuffs of the invention may be used for dyeing mixed fabrics, for example, mixtures of wool and viscose staple fiber. For this purpose it is advantageous to conduct the dyeing in a neutral bath in the presence of sodium chromate or potassium chromate.

What I claim is:

1. An azo-dyestuff of the formula

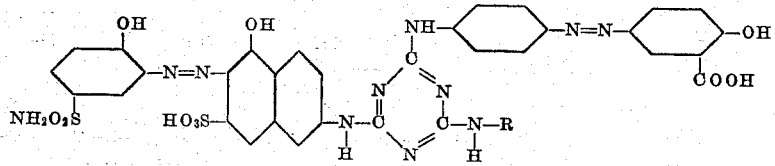

wherein R is selected from the group consisting of

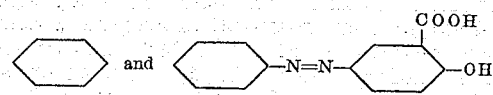

2. The azo-dyestuff of the formula

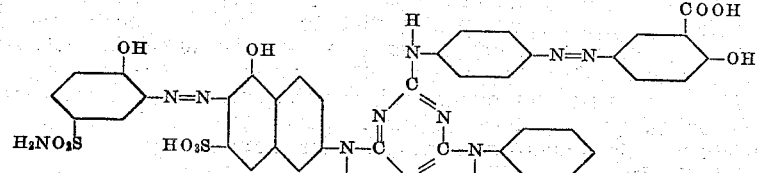

3. The azo-dyestuff of the formula

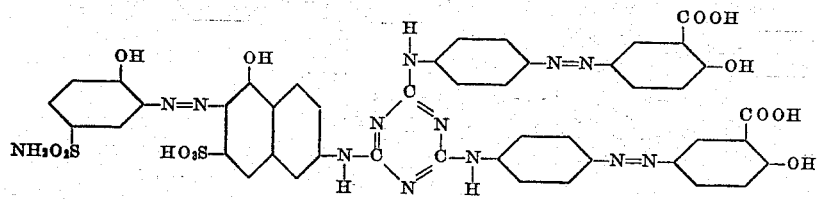

EDUARD BERNASCONI.

REFERENCES CITED

The following references are of record in the file of this patent:

UNITED STATES PATENTS

| Number | Name | Date |
|---|---|---|
| 2,268,919 | Anderau | Jan. 6, 1942 |
| 2,387,997 | Kaiser | Oct. 30, 1945 |
| 3,396,659 | Kaiser | Mar. 19, 1946 |

Certificate of Correction

Patent No. 2,460,618.　　　　　　　　　　　　　　　　　　　February 1, 1949.

EDUARD BERNASCONI

It is hereby certified that errors appear in the printed specification of the above numbered patent requiring correction as follows:

Column 3, line 69, for "hologen" read *halogen*; line 74, for the word "than" read *then*;
and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*